(12) United States Patent
May

(10) Patent No.: US 7,401,736 B2
(45) Date of Patent: Jul. 22, 2008

(54) CARD READER

(75) Inventor: David C. C. May, Fife (GB)

(73) Assignee: NCR Corporation, Dayton, OH (US)

( * ) Notice: Subject to any disclaimer, the term of this patent is extended or adjusted under 35 U.S.C. 154(b) by 37 days.

(21) Appl. No.: 11/217,831

(22) Filed: Sep. 1, 2005

(65) Prior Publication Data

US 2006/0054700 A1 Mar. 16, 2006

(30) Foreign Application Priority Data

Sep. 14, 2004 (GB) .................................. 0420443.4

(51) Int. Cl.
*G06K 7/08* (2006.01)
(52) U.S. Cl. .................. 235/449; 235/439; 235/444; 235/475; 235/486; 235/483; 235/477; 235/478
(58) Field of Classification Search ................ 235/380, 235/449, 439, 444, 474–475, 477–486
See application file for complete search history.

(56) References Cited

U.S. PATENT DOCUMENTS

| | | | | |
|---|---|---|---|---|
| 3,972,027 A * | 7/1976 | Garziera | ...................... | 710/33 |
| 4,088,878 A * | 5/1978 | Schasser | ...................... | 235/436 |
| 4,405,959 A * | 9/1983 | Chabrolle | ................... | 360/119 |
| 4,529,872 A * | 7/1985 | Dinges | ........................ | 235/482 |
| 4,575,621 A * | 3/1986 | Dreifus | ........................ | 235/380 |
| 4,672,661 A | 6/1987 | Clark, Jr. et al. | | |
| 4,800,551 A * | 1/1989 | Norris | .......................... | 720/618 |
| 4,914,279 A * | 4/1990 | Massey | ....................... | 235/449 |
| 5,191,198 A * | 3/1993 | Do | ............................... | 235/483 |
| 5,679,942 A * | 10/1997 | Toyama | ....................... | 235/449 |
| 5,698,832 A | 12/1997 | Someya et al. | | |
| 6,250,552 B1 * | 6/2001 | Hirasawa | .................... | 235/475 |
| 6,666,382 B2 * | 12/2003 | Lisimaque et al. | .......... | 235/492 |
| 2002/0170957 A1 * | 11/2002 | May | .............................. | 235/380 |

FOREIGN PATENT DOCUMENTS

EP 0 083 742 A1 7/1983
JP 09231323 A * 9/1997

* cited by examiner

*Primary Examiner*—Steven S Paik
*Assistant Examiner*—Tuyen K Vo
(74) *Attorney, Agent, or Firm*—Gregory A. Welte

(57) ABSTRACT

A card reader for reading magnetic stripe cards which are manually inserted, and withdrawn, by a user. The card is constrained to follow a path which displaces the card laterally while the card is outside the reader, and before the magnetic stripe reaches a magnetic sensor within the reader. The lateral displacement prevents an illicit magnetic sensor, positioned externally to the reader by a hacker, from reading the magnetic stripe, since the stripe is moving in an incorrect direction while the card is external to the reader.

16 Claims, 3 Drawing Sheets

CARD READER

BACKGROUND

The present invention relates to a card reader module, in particular to a manual insertion or "dip" card reader. More particularly, the invention addresses the issue of card skimming at a self-service terminal (SST), such as an automated teller machine (ATM), or any other terminal using a manual insertion card reader module.

There are two different types of card readers, manual (or dip) card readers and automatic card readers. In automatic card readers a sensor adjacent to the card entry slot detects the presence of a card bearing a magnetic stripe. Once the magnetic strip is detected an internal shutter is activated and moves out of the path of the card. As the card is partially inserted it is received by transport rollers which transport the card into the body of the reader. The problem of "skimming" a card, where the magnetic stripe is read by an unauthorized reading device placed over the card slot, may be addressed by ensuring that the motion of the card is irregular until the card is fully within the body of the card reader. This randomly fluctuating path is achieved by programmed control of the aforementioned transport rollers, as detailed in U.S. Pat. No. 6,460,771, in the name of NCR Corporation.

However, in dip card readers the card is inserted and withdrawn manually, by the user, and the approach detailed above is not feasible.

A dip card reader makes two attempts to read a magnetic stripe card, once during the insertion phase and once again during the withdrawal phase. The dip card reader uses the better of the two readings (normally the withdrawal reading) to process the transaction. The card motion during the manual process must be uniform to achieve a good reading of the magnetic stripe. Any fluctuation as with the automatic reader would result in a failure to read the magnetic stripe.

As briefly mentioned above, card skimming is the copying of the data stored on a magnetic stripe of a card either directly onto another card or into some form of storage, to be transferred at some later date onto a card, which can then be used for fraudulent purposes. This is a particular problem for dip card readers, given that the solution utilized with automatic card readers cannot be applied to dip readers.

The commercial significance of this problem is heightened by the fact that many ATM's or other self-service devices use dip card readers that are operated by customers in an unsupervised environment. This gives criminals the opportunity to attach a skimming device to the outside of a dip reader which is designed to blend in with the fascia of the ATM or self-service device in order not to arouse the customer's suspicion. The skimming device does not prevent the user from withdrawing the card, nor does it prevent legitimate reading of the card by the card reader, hence giving the user no hint that any fraud has taken place. Therefore, the customer departs having completed the transaction and is completely unaware that all the details on the magnetic stripe on their card have been stolen.

Skimming, especially with dip card readers, has been a significant issue for ATM service providers for many years. Consequently, there has long been a need to address this extremely commercially significant issue, without notable success.

SUMMARY

According to a first aspect of the invention there is provided a card reader comprising a housing having a card entry slot, a magnetic read head located within the housing, guide means arranged to guide inserted cards to the read head to be read, wherein the guide means is arranged to displace a card laterally with respect to the entrance slot during insertion and withdrawal of the card.

Preferably the guide means is a reference edge incorporating an offset arranged to move the card laterally.

Preferably the position of the offset on the reference edge is variable.

Preferably the angle of the offset is variable.

Preferably the offset is adapted to be different in a withdrawal phase from an insertion phase of a card insertion operation.

Alternatively the guide means, for varying the path of the card reader, is cam guide.

Preferably the card reader is further provided with urging means arranged to ensure that the card follows the path defined by the guide means.

Preferably the guiding means is resiliently biased towards the guide means.

Preferably the urging means is a spring-loaded urging means.

Preferably the card reader further includes a sensor arranged to detect the presence of a magnetic stripe card.

Most preferably the card reader further including a second sensor arranged to detect if the urging means has been tampered with.

By virtue of this invention a card may be safely inserted and read by a legitimate dip card reader while foiling attempts to read the card by unauthorized parties. The invention describes an apparatus that prevents a skimming device from reading all of the data on a magnetic stripe because the card is physically moved away from the magnetic stripe read head in the skimming device during insertion and withdrawal of a card.

According to another aspect of the invention there is provided a self-service terminal (SST) incorporating a card reader as described above.

The SST may be an automated teller machine (ATM). Alternatively the SST may be a point-of-sale (POS) terminal.

According to another aspect of the invention there is provided a method of reading a magnetic stripe card utilizing a card reader as described above, the method comprising the steps of: inserting a magnetic card into a card reader and guiding said card along a path defined by a reference means, and using a magnetic read head to read the card when the card has been moved laterally with respect to the entry slot by a reference means.

According to another aspect of the invention there is provided a method of reading a magnetic stripe card utilizing a card reader as described above, the method comprising the steps of: receiving a magnetic card into a card reader, through an entry slot, and guiding said card along a path defined by a guide means, and reading the card only when the card has been moved laterally with respect to the entry slot.

BRIEF DESCRIPTION OF THE DRAWINGS

Embodiments of the present invention will now be described, by way of example, with reference to the accompanying drawings, in which.

DETAILED DESCRIPTION

Figure 1:
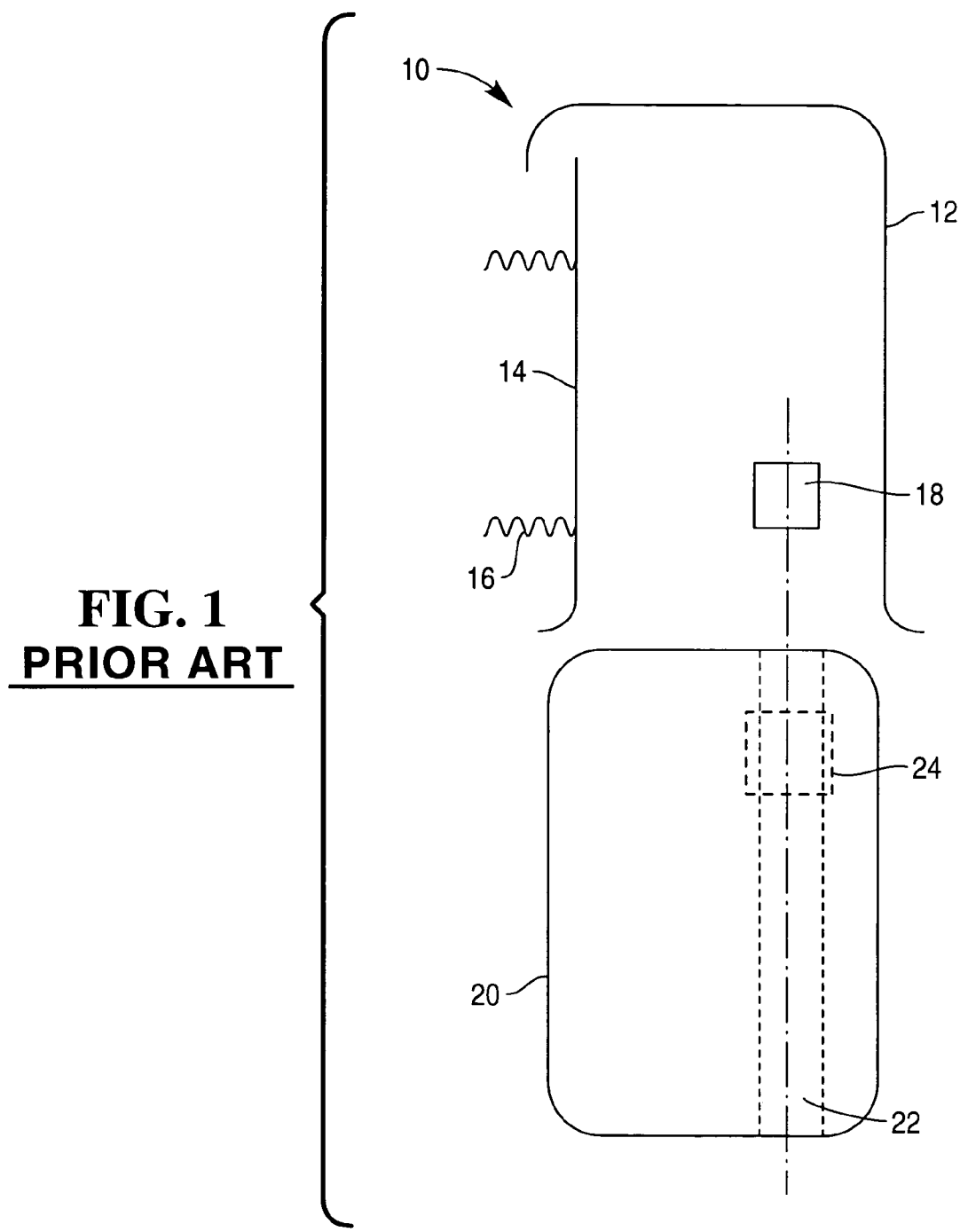
FIG. 1 is schematic view of a known manual insertion card reader.

FIG. 1 is schematic view of a known type of manual insertion card reader ("dip card reader") 10 showing guide means 12, spring-loaded urging means 14 with springs 16, and magnetic stripe read head 18. There is also shown a card 20 with magnetic stripe 22. FIG. 1 also shows the typical position of a skimmer magnetic stripe read head 24.

As shown in FIG. 1, a prior art dip card reader 10 has two main components, the guide means 12, and urging means 14, to make sure that the magnetic read head 18 of the reader aligns correctly with data written on the magnetic stripe 22 of the card 20. The magnetic read head 18 is designed to read one to three tracks of magnetic data, the format and position on the card being defined in ISO standards, ISO/IEC 7810 and ISO/IEC78 11.

The card slides along the guide means in the form of a reference edge 12 of the card reader 10 during card entry or removal. This reference edge 12 ensures that the magnetic read head 18 and data on the magnetic stripe align correctly. The spring-loaded urging means 14 makes sure that as card 20 enters or leaves the card reader the card 20 is always pressed against guide means 12, ensuring correct alignment between the magnetic read head 18 and data on the magnetic stripe 22. Note that if a card-skimming device is added, the fraudulent read head 24 must also align with magnetic read head 18.

Figure 2:
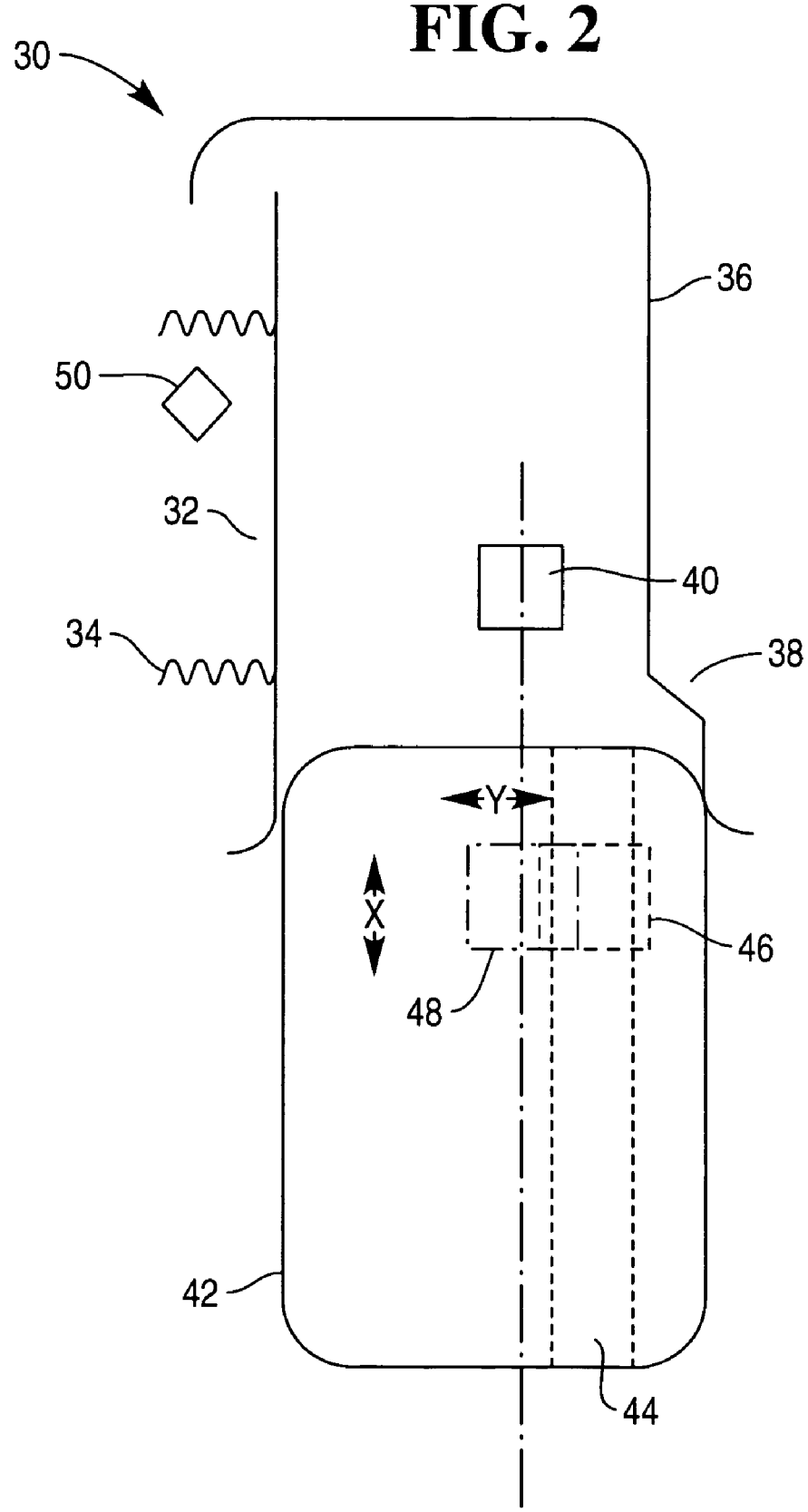
FIG. 2 is schematic view of a manual insertion card reader in accordance with an embodiment of the present invention.

FIG. 2 is schematic view of a dip card reader 30 in accordance with one embodiment of the present invention. A dip card reader 30 has a urging means 32, with biasing means 34, (here shown as a spring), and a reference edge 36 which is shaped with an offset or ridge 38. A magnetic read head 40 is located so that the magnetic stripe 44 is only brought into line with the reader head 40 once the card has been moved laterally with respect to the entry slot. Herein the term "laterally with respect to the entry slot" is intended to mean moved sideways, orthogonally (direction Y, FIG. 2) to the general direction of motion (X) of the card. Also shown is a card 42 with magnetic stripe 44. Two possible positions 46, 48 of a skimmer magnetic read head are also shown.

The reading of a card in the legitimate dip card reader 30 is performed in the same manner as described for FIG. 1 above. The magnetic read head 40 is the same as magnetic read head 18. The resiliently biased urging means 32 may be provided by means of a spring-loaded member as shown, and card 42 is identical to card 20.

However, reference edge 36 has an offset 38 at the entrance slot of the dip card reader 30. This offset can be arranged to be constant or variable in dimension in order to vary the path of the card in and out of the card reader 30, as long as the offset is designed to bring the magnetic stripe 44 on the card into line with the read head 40.

When card 42 initially enters the dip card reader 30, the magnetic stripe 44 does not align with the magnetic head of the reader 40. It is only after passing the offset 38 that magnetic card data in stripe 44 and head 40 align, enabling the data held on the magnetic stripe 44 of the card 42 to be read as described above.

A skimming device, which is positioned outside the reader 30, will initially read the first part of the card 42. If the skimming magnetic track reading device is aligned with guide 36 at the entry to the dip card reader 30, this means that the fraudulent skimming reading device must be in position 46. When the card passes the offset 38 in the reader, the card 30 moves and the skimming magnetic track-reading device is no longer in alignment with the data on the magnetic stripe. Thus the card-skimming device cannot capture the data on the magnetic stripe 44.

In order to read data on a magnetic stripe 44 the read head of the skimming device would need to take into account the lateral movement of the card. Therefore the read head would need to be in position 46. An offset of as little as 3 mm can make all tracks unreadable; an offset of 10 mm means no data at all.

To be effective, a fraud skimming device would have to have a skimming magnetic head not only capable of moving from position 46 to 48, but it would also have to follow the profile of the offset, which would be extremely difficult. The offset 38 and the position and slope of the offset can vary in dimension and profile to make it even more difficult for any skimmer to follow the path of the magnetic stripe 44 and read the data held therein. This added enhancement makes the chance of a card entering such a reader and being skimmed extremely remote.

The resiliently biased urging means 32 is not essential, but is very important as it assists in keeping the card 42 pressed against reference edge 36 both before the offset 38 at the entrance to the reader and after the offset 38 when the card 42 is being read.

The card reader 30 can also be fitted with an urging means position detector 50. A further sensor is also provided to detect when a card is or is not present. The urging means position detectors 50 detect attempts to interfere with the guide 32 and thus overcome the effect of the offset 36. For example, when it is detected that no card is present then the urging means 32 should be fully extended. If the detector 50 detects that the urging means is not in its fully extended position then the reader (and associated SST) can be shut down, as it has most probably been interfered with for fraudulent purposes.

Conversely, if a card is present then the detector should show that the guide has become compressed. Again diagnostic systems of the card reader or SST can use this feature to ascertain if the card reader has been tampered with, and appropriate action and/or security measures taken. For example, the card reader may issue a warning to the user if the resiliently biased guide is detected in an unusual position or abnormal arrangement.

Figure 3:
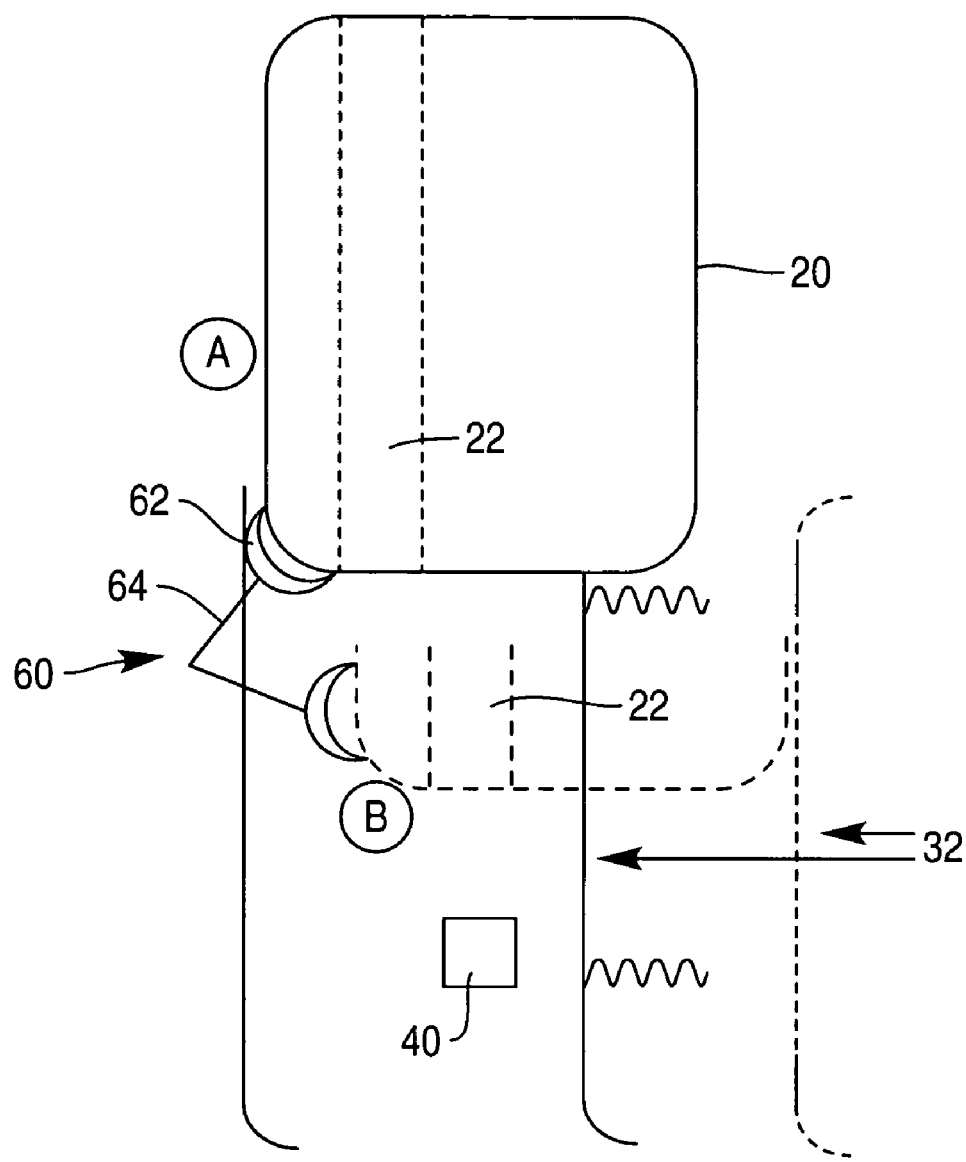
FIG. 3 is a schematic view of a manual insertion card reader in accordance with a second embodiment of the present invention.

Other means may be utilized, in place of the guide means 36, in FIG. 2, to move the card laterally during insertion and removal. For example, FIG. 3 schematically represents a hinged cam guide 60 which can be used in place of the reference means 12, in accordance with a further embodiment of the present invention.

The guide 60 is a receiving means 62 rotatably mounted on a cam arm 64, which moved between position A and position B during movement of the card 20 into or out of the housing. The means 62 is biased towards the position illustrated in A. By the time the card has reached position B the means 62 has rotated and the card eventually frees itself from the guide 60 and moves into the housing for the reader to read the magnetic stripe 22, as in the earlier embodiment. In both embodiments the lateral movement of the card is complete before the magnetic stripe 22 reaches the reader 40.

During withdrawal of the card, the card is again received by the cam means at position B and is guided back to position A under the influence of the cam guide means 60. As with the earlier embodiment an urging means 32 is provided, for the same reason as in the earlier embodiment.

Modifications may be incorporated without departing from the scope of the present invention.

What is claimed is:

1. A card reader which reads a data-bearing magnetic stripe on a card comprising:
 (a) a housing having a card entry slot;
 (b) a magnetic read head located within the housing; and
 (c) guide means for
  (i) displacing a card laterally with respect to the entrance slot during initial insertion of the card, and prior to engagement of the read head with the magnetic stripe,
  ii) terminating the lateral displacing before the magnetic stripe reaches the read head, and then
  iii) guiding the magnetic stripe in a path across the read head, which path enables reading of the data by the read head, as insertion continues.

2. A card reader as claimed in claim 1, wherein the guide means includes a reference edge incorporating an offset arranged to move the card laterally.

3. A card reader as claimed in claim 2, wherein the offset on the reference edge changes position laterally as the card advances into the reader.

4. A card reader as claimed in claim 2, in which
 i) the offset causes the card to travel at an angle with respect to the path, and
 ii) the angle changes as the card moves.

5. A card reader as claimed in claim 2, wherein the offset is adapted to be different in a withdrawal phase from an insertion phase of a card insertion operation.

6. A card reader as claimed in claim 1, wherein the guide means comprises a cam guide for varying a path of the card reader.

7. A card reader as claimed in claim 1, further comprising urging means for ensuring that the card follows a path defined by the guide means.

8. A card reader as claimed in claim 7, wherein the urging means is resiliently biased towards the guide means.

9. A card reader as claimed in claim 8, wherein the urging means comprises a spring-loaded member.

10. A card reader as claimed in claim 1, further comprising a sensor for detecting the presence of a magnetic stripe card.

11. A card reader as claimed in claim 10, further comprising a second sensor for detecting if an urging means has been tampered with.

12. Card reader according to claim 1, in which the guide means displaces an inserted card laterally with respect to the entrance slot during withdrawal of the card after the magnetic stripe loses contact with, and retreats from, the read head.

13. Card reader according to claim 1, in which the magnetic stripe travels without lateral movement across the read head, as the read head collects data from the magnetic stripe during insertion.

14. Card reader according to claim 1, in which the magnetic stripe travels without lateral movement across the read head, as the read head collects data from the magnetic stripe during withdrawal.

15. A card reader for reading a card bearing a magnetic stripe, comprising:
 a) a housing;
 b) a magnetic read head within the housing, which reads the magnetic stripe; and
 c) a guide system which guides the card past the read head, along a path which causes the magnetic stripe to incorrectly align with any second magnetic read head located outside the housing.

16. A card reader for reading a card bearing a magnetic stripe, comprising:
 a) a housing;
 b) a magnetic read head within the housing, which reads the magnetic stripe; and
 c) a guide system which guides the card past the read head, along a path which requires any additional magnetic read head, located external to the housing, to move as the card moves, in order to read the magnetic stripe.

* * * * *